May 30, 1933.  W. H. MARSH  1,911,521
LIQUID METER
Filed April 22, 1931  2 Sheets-Sheet 1

INVENTOR
Walter H. Marsh
by William B. Jaspert
Attorney.

May 30, 1933.  W. H. MARSH  1,911,521
LIQUID METER
Filed April 22, 1931  2 Sheets-Sheet 2

INVENTOR
Walter H. Marsh
by William B. Jasper
Attorney.

Patented May 30, 1933

1,911,521

UNITED STATES PATENT OFFICE

WALTER H. MARSH, OF PITTSBURGH, PENNSYLVANIA

LIQUID METER

Application filed April 22, 1931. Serial No. 531,898.

This invention relates to improvements in liquid meters for measuring the flow of liquid and more particularly to meters of the type employed for measuring gasoline in gasoline dispensing equipment where a steady source of fluid is delivered under pressure to the liquid dispensing nozzle.

It is among the objects of this invention to provide a meter of the above designated character which shall be of simple, compact and durable mechanical construction; which shall be positive in registering the amount of liquid passing therethrough; and which shall be constructed and operated in a manner to eliminate substantially all wearing strain from its movable parts.

Another object of the invention is the provision of a single means for adjusting the stroke of two of the pistons in the measuring cylinders when such adjustment is desired or necessary and which shall be adapted to permit the pistons to travel to the extreme position of their stroke without employing a positive driving connection as has been heretofore practiced.

Figure 1:
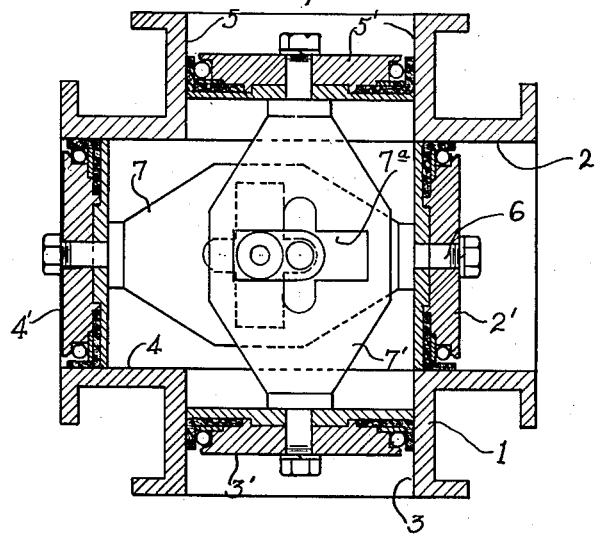
Figure 2:
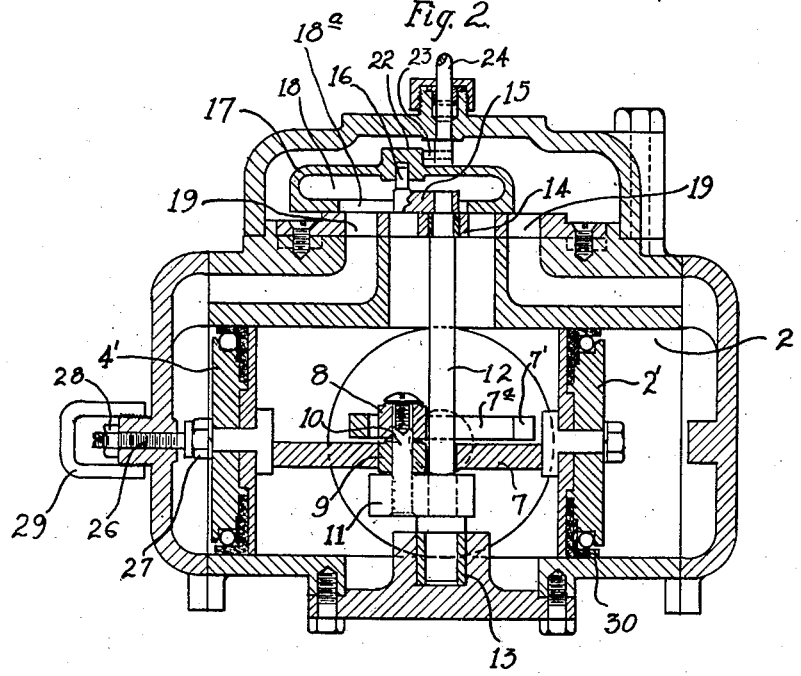
Figure 3:
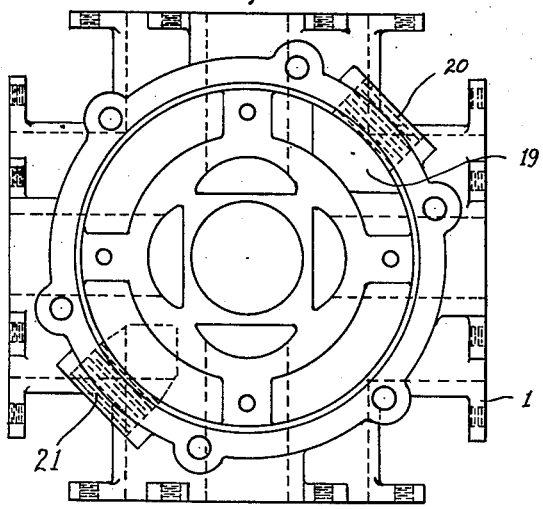
Figure 4:
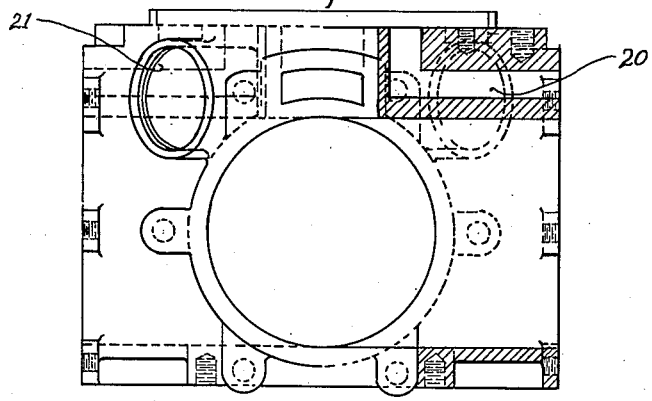

These and other objects will become more apparent from a consideration of the accompanying drawings constituting a part hereof in which like reference characters designate like parts and in which Figure 1 is a cross-sectional view of a liquid metering system embodying the principles of this invention; Figure 2 a vertical cross-sectional view thereof; Figure 3 a top plan view of the meter casing; Figure 4 a side elevational view thereof, partially in section; and Figure 5 a vertical section of a portion of the housing showing the inlet and outlet connections for the fluid.

With reference to Figures 1 and 2 of the drawings, the structure therein illustrated comprises a casting generally designated at 1 having cylinder bores 2, 3, 4 and 5 in which piston 2', 3', 4', and 5' are operatively disposed. The pistons are fastened on rods 6 with opposite piston rods integrally joined with or secured to Scotch yokes 7 each yoke carrying a pair of pistons, which operate simultaneously by lateral movement of the yokes which is effected through rollers 8 and 9 that are carried by a pin 10 of a crank 11 secured to the end of a crank shaft 12. The rollers 8 and 9 are disposed in rectangular shaped slots 7a of the yokes 7 and 7'. The shaft 12 is journalled at its ends in bearings 13 and 14 and is provided with a crank 15 having a vertically projecting pin 16 that engages a slide valve 17.

Figure 5:
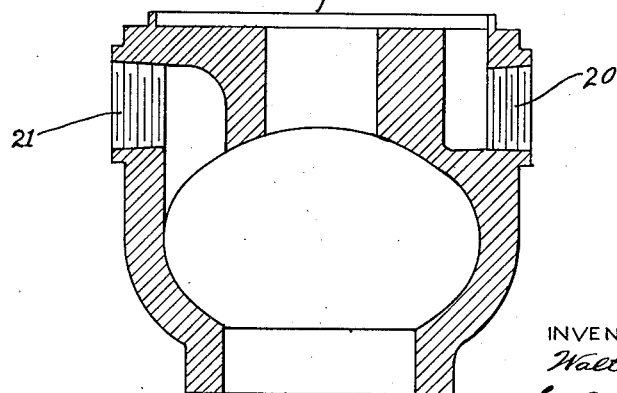

The valve is provided with a chamber 18 which is adapted to connect through an ing 18a with fluid passages 19 leading to the several piston cylinders and to inlet and outlet connections 20 and 21 respectively, as shown in Figures 3 to 5 of the drawings.

The top of valve 17 is provided with a boss-like member 22 which engages a pin or arm 23 of a shaft 24 causing the latter to rotate in response to the sliding movement of the valve about the axis of the crank shaft 12. The shaft 24 operates the indicator of the meter which is of the usual construction and is subjected to angular movement to register the fluid flow on a properly graduated dial.

As shown in Figure 2, adjustment of the stroke of the pistons may be made by a screw 26 having an abutment 27 at one end and a lock nut 28 at the other. A cap 29 is provided to prevent disturbance of the adjustment after it is made. On account of the loose connection of the rollers 8 and 9 with the slots 7a of yokes 7 and 7', the pistons may be interrupted at different positions near the end of the stroke without imposing any strain on the connections with the crank shaft 12, and accordingly, by adjusting the screw 26 to change the location of the abutment 27, the piston travel will be regulated.

The operation of the metering mechanism is briefly as follows: The meter is connected in the pressure line of the pump with the inlet connection 20 joined to the pressure line on the pump side and the outlet 21 connected to the delivery or dispensing side of the meter.

When the pump or other pressure means is operated, the fluid will flow in the inlet 20 and into the passages 19 to the piston cylinders 2, 3, 4 and 5, causing the pistons to be displaced inwardly. The piston connections with the Scotch yokes will actuate the crank shaft 12 and cause the crank 15 to subject valve 17 to sliding movement in timed relation with the movement of the pistons to alternately connect and disconnect the source of pressure with the piston cylinders. The fluid on the back stroke of the pistons is dispensed from the cylinders through the outlet connection 21 to use, and the movement of the valve is registered on the dial by the indicator shaft 24. The valve moves as an orbital member about the axis of shaft 12 and by its loosely fitting connection with pin 16 it is also free to rotate about its own axis.

The pistons are provided with leather cups 30 or other suitable packing means to prevent fluid flowing around the pistons whereby the volume of the fluid in the cylinders is accurately maintained, thereby assuring proper registration of the quantity on the metering dial in accordance with the coordinated movements of the pistons, crank shaft, and sliding valve.

On account of the loose connections of the rollers 8 and 9 with the slots of the Scotch yokes, there is no strain on the connections or crank bearings and little possibility of any wear. This construction also assures proper functioning of the respective pistons in that it assures that their cylinders are completely filled for each stroke, since it is impossible to interrupt the full stroke of the piston members until they abut against their stops or the abutment 27 of the adjusting screw.

Although one embodiment of the invention has been herein illustrated and described, it will be obvious to those skilled in the art that various modifications may be made in the details of construction without departing from the principles herein set forth.

I claim:

1. A metering system for liquids comprising a casing having a plurality of measuring cylinders and ported passages leading from the cylinders to a source of liquid supply and to a discharge, pistons disposed in said cylinders, a valve controlling the flow of liquid in said passages to and from said cylinders, a shaft for a registering device actuated by said valve for indicating the volume of liquid displaced by the pistons in said cylinders, means operatively connecting said pistons for correlated movement, and means connecting said valve and last named means whereby the valve is subjected to sliding movement in response to movement of said pistons, the means last mentioned permitting said valve to rotate freely about its own axis in its flow controlling movement.

2. A metering system for liquids comprising a casing having a plurality of measuring cylinders and ported passages leading from the said cylinders to a source of liquid supply and to a discharge point, pistons disposed in said cylinders having connecting yokes with slotted openings, a valve controlling the flow of liquid in the ported passages, a shaft for a registering device for measuring the volume of liquid displaced by the pistons in said cylinders, and having an actuating member in the path of movement of said valve, and a crank shaft having a crank connection with the slotted openings of the piston yokes, and having a crank constituting a pivot connection for said valve whereby the valve is subjected to circular and rotating movement to control the flow in said passages, and to simultaneously actuate said registering device.

3. A metering system for liquids comprising a casing having a plurality of measuring cylinders and ported passages leading from the cylinders to a source of liquid supply and to a discharge point, pistons disposed in said cylinders and connected by slotted yokes to be operative in pairs, a crank shaft actuated by said pistons having a crank connection with said slotted yokes, rollers mounted on the crank for engagement with the slots of said piston connections, a valve controlling the flow of liquid through the ported passages and having a crank connection with said crank shaft whereby the valve is subjected to sliding movement over its flow controlling port and through rotary movement on the crank pin, and a shaft for a registering device for measuring the volume of liquid discharged by said cylinders, said shaft having an arm disposed in the path of movement of said valve constituting an abutment whereby the registering device is actuated by the valve movement.

4. A metering system for liquids comprising a casing having piston cylinders disposed at right angles with their axes in a common horizontal plane, a valve chamber having a fluid passage to the center of said cylinders and fluid passages to the respective ends of said cylinders, pistons dividing the center and end passages of the cylinders and a valve dividing said passages in the valve chamber, yokes connecting said pistons to render them operative in pairs and having slots therein, a shaft journalled in the valve casing having a pair of cranks one of which supports rollers for engaging the slots of the piston yokes to be actuated thereby, and the other constituting an operating connection for said valve to adapt the latter for sliding and rotary movement, and regulable means independent of said piston connections for adjusting the length of stroke of said pistons.

5. A metering system for liquids comprising a housing having a plurality of cylinders arranged in pairs in coaxial alinement, one pair of cylinders having their axes at right angles to the axes of the other pair, and said cylinders having fluid passages to a common valve chamber, pistons for said cylinders having yoke connections to render the pistons for each of said cylinders simultaneously operative, said yokes having elongated slots, rollers for engagement with said slots, a crank shaft journalled in said housing and having a pair of cranks, one of which is disposed below said piston yoke to support said rollers, and the other of which is disposed in the valve chamber, and a slide valve in the valve chamber journalled on said last named crank, said valve chamber having inlet and outlet connections leading to a source of liquid under pressure and to a dispensing means whereby the pistons are actuated by the fluid flowing to the measuring cylinders to actuate the connected crank shaft and slide valve to control the flow of liquid in said passages.

In testimony whereof I have hereunto set my hand.

WALTER H. MARSH.